United States Patent
Nelson et al.

(10) Patent No.: US 11,650,984 B2
(45) Date of Patent: May 16, 2023

(54) USING A CACHING LAYER FOR KEY-VALUE STORAGE IN A DATABASE

(71) Applicant: RED HAT, INC., Raleigh, NC (US)

(72) Inventors: Mark Nelson, Minnetonka, MN (US); Gabriel Zvi BenHanokh, Tel-Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/387,303

(22) Filed: Jul. 28, 2021

(65) Prior Publication Data

US 2023/0032841 A1 Feb. 2, 2023

(51) Int. Cl.
| | |
|---|---|
| *G06F 16/24* | (2019.01) |
| *G06F 16/2455* | (2019.01) |
| *G06F 16/22* | (2019.01) |
| *G06F 12/123* | (2016.01) |
| *G06F 16/21* | (2019.01) |

(52) U.S. Cl.
CPC ...... *G06F 16/24552* (2019.01); *G06F 12/123* (2013.01); *G06F 16/214* (2019.01); *G06F 16/2282* (2019.01); *G06F 2212/1021* (2013.01)

(58) Field of Classification Search
CPC ....... G06F 16/24552; G06F 2212/1021; G06F 12/123; G06F 16/214; G06F 16/2282
See application file for complete search history.

(56) References Cited

U.S. PATENT DOCUMENTS

| | | | |
|---|---|---|---|
| 8,041,689 B2 * | 10/2011 | Rowley | H04L 61/4523 707/694 |
| 10,891,264 B2 * | 1/2021 | Wang | H04L 67/568 |
| 11,360,863 B2 * | 6/2022 | Varadan | G06F 16/2246 |
| 11,526,960 B2 * | 12/2022 | Tu | G06T 1/60 |
| 2009/0313418 A1 * | 12/2009 | Ross | G06F 12/0246 711/E12.001 |
| 2012/0072656 A1 * | 3/2012 | Archak | G06F 16/134 711/104 |

(Continued)

OTHER PUBLICATIONS

Balmau Oana et al: "FloDB : Unlocking Memory in Persistent Key-Value Stores", Apr. 2017 (Apr. 23, 2017) pp. 80-94 (Year: 2017).*

(Continued)

*Primary Examiner* — Merilyn P Nguyen
(74) *Attorney, Agent, or Firm* — Kilpatrick Townsend & Stockton LLP

(57) ABSTRACT

A technique for using a caching layer for key-value storage in a database is described. In one example of the present disclosure, a system can receive, at an unsorted data structure of a caching layer, a key-value pair associated with a data object. The unsorted data structure can store a first plurality of key-value pairs. The system can receive one or more operations for updating the key-value pair in the caching layer. The system can determine the key-value pair is to be migrated to a sorted memory table based on a caching algorithm. The system can migrate the key-value pair to a sorted memory table configured to store a second plurality of key-value pairs that is larger than the first plurality of key-value pairs and sort the key-value pair with the second plurality of key-value pairs prior to storing the key-value pair in the sorted memory table.

20 Claims, 5 Drawing Sheets

(56) References Cited

U.S. PATENT DOCUMENTS

| | | | | |
|---|---|---|---|---|
| 2014/0344391 | A1* | 11/2014 | Varney | H04L 47/822 |
| | | | | 709/213 |
| 2016/0100006 | A1* | 4/2016 | Markus | H04L 67/1097 |
| | | | | 709/219 |
| 2016/0253386 | A1* | 9/2016 | Burns | H04L 67/125 |
| | | | | 707/758 |
| 2016/0335104 | A1* | 11/2016 | Elias | G06F 13/102 |
| 2017/0212680 | A1* | 7/2017 | Waghulde | G06F 3/0616 |
| 2020/0183886 | A1 | 6/2020 | Wang et al. | |
| 2020/0233801 | A1* | 7/2020 | Gupta | G06F 16/9027 |
| 2020/0249995 | A1* | 8/2020 | Wong | G06F 9/544 |
| 2020/0250148 | A1* | 8/2020 | Dayan | G06F 7/14 |
| 2020/0333968 | A1* | 10/2020 | Bortnikov | G06F 3/0685 |
| 2021/0097044 | A1* | 4/2021 | Idreos | G06F 16/901 |
| 2021/0318987 | A1* | 10/2021 | Park | G06F 3/0659 |
| 2021/0390062 | A1* | 12/2021 | Wen | G06F 12/0875 |
| 2022/0107931 | A1* | 4/2022 | Paduroiu | G06F 16/2282 |
| 2022/0382760 | A1* | 12/2022 | Pang | G06F 16/2322 |

OTHER PUBLICATIONS

Extended Search Report and Written Opinion for EP Appln. No. 21198464.6 dated Mar. 21, 2022.

Balmau et al., "FloDB: Unlocking Memory in Persistent Key-Value Stores," Proceedings Of The Twelfth European Conference On Computer Systems, Apr. 23, 2017, pp. 80-94.

Li et al., "Improving Read Performance of LSM-Tree Based KV Stores via Dual Grained Caches," 2019 IEEE 21st International Conference on High Performance Computing and Communications; IEEE 17th International Conference on Smart City; IEEE 5th International Conference on Data Science And Systems, Aug. 10, 2019, pp. 841-848.

Luo et al., LSM-based Storage Techniques: A Survey, arxiv.org, Cornell Unv. Library, Dec. 18, 2018, pp. 1-25.

Kannan et al., "Redesigning LSMs for Nonvolatile Memory with NoveLSM," Proceedings Of The 2018 USENIX Annual Technical Conference, Jul. 11, 2018, pp. 993-1005.

Zhu et al., "SolarDB: Toward A Shared-Everything Database on Distributed Log-Structured Storage," ACM Transactions On Storage, vol. 15, No. 2, Jun. 26, 2019, pp. 1-26.

Madhurima Ray, K.K., et al., "FlashKey: A High-Performance Flash Friendly Key-Value Store," IEEE International Parallel and Distributed Processing Symposium, May 18-22, 2020, https://ieeexplore.ieee.org/document/9139846.

Wu, F., et al., "AC-Key: Adaptive Caching for LSM-based Key-Value Stores," USENIX, Jul. 15-17, 2020, USENIX Annual Technical Conference, https://www.usenix.org/conference/atc20/presentation/wu-fenggang.

* cited by examiner

USING A CACHING LAYER FOR KEY-VALUE STORAGE IN A DATABASE

TECHNICAL FIELD

The present disclosure relates generally to database storage. More specifically, but not by way of limitation, this disclosure relates to a caching layer for key-value storage in a database.

BACKGROUND

Data objects can be stored in databases, such as log structured merge databases, as key-value pairs. A database can include a memory table, where key-value pairs are initially stored, and a disk storage device, where key-value pairs from the memory table are moved once the memory table is full. Key-value pairs may be stored unsorted or sorted in the memory table, but, key-value pairs are stored sorted in the disk storage device. When a request is received for a key-value pair in the database, the memory table is searched prior to the disk storage device.

DETAILED DESCRIPTION

Figure 1:
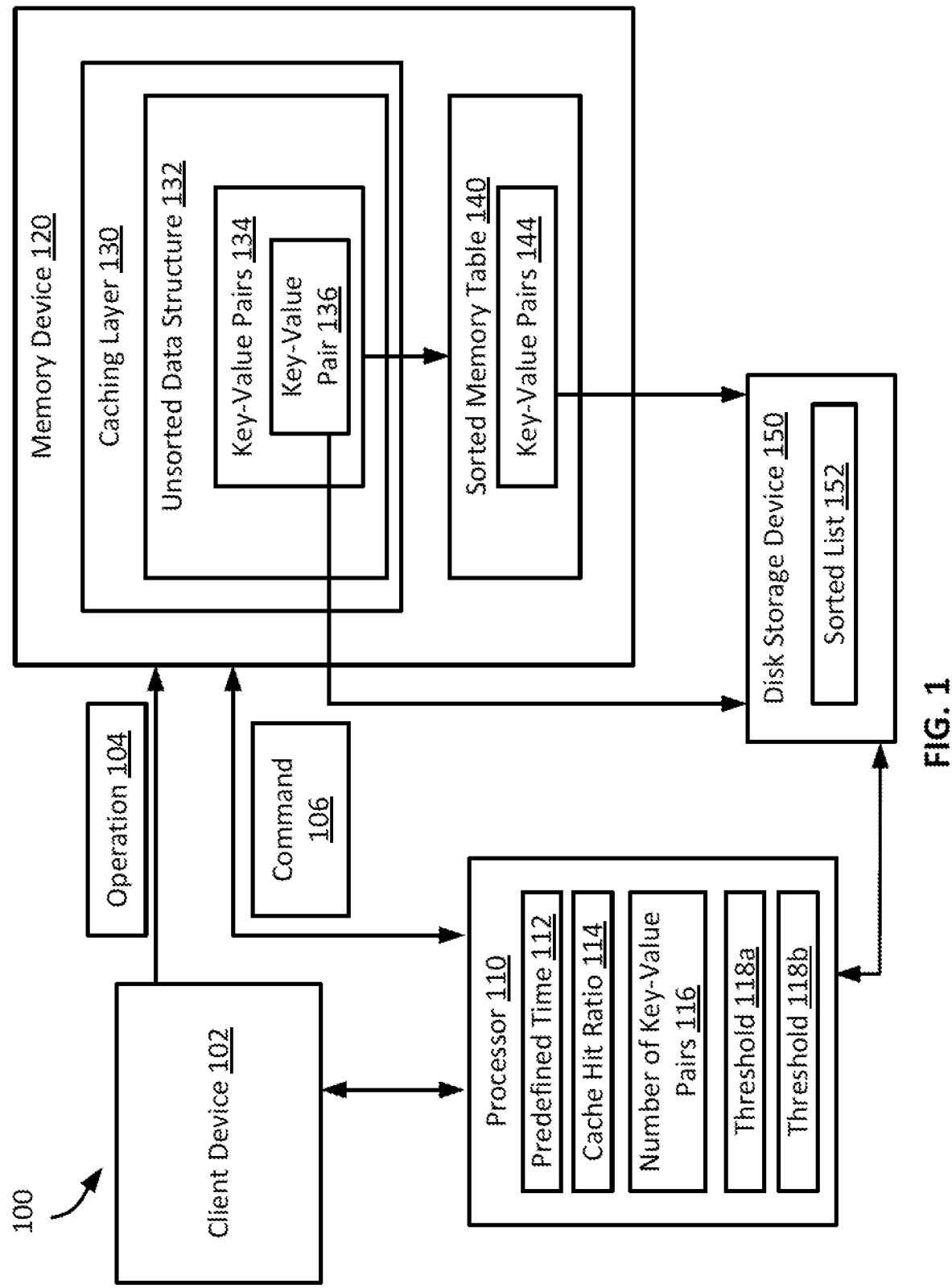
FIG. 1 shows a block diagram of an example of a system for implementing a caching layer for key-value storage in a database according to some aspects of the present disclosure.

Key-value pairs for data objects can be stored in a memory table of a database prior to being stored in a disk storage device of the database. Some databases, such as log structured merge databases, can be built to optimize disk-writes by aggregating writes and bulk writing them sorted to allow for fast search. To optimize write access, the database aggregates a large number of writes in the memory table before committing them to the disk. Key-value pairs may be kept sorted in the memory table to allow for a quick migration of sorted data to the disk storage device. But, there may be a Log(N) access time associated with sorted memory tables, meaning that searching a memory table with one-million entries requires passing through 20 nodes. This can add high cost to every operation done on the database. Conventional methods attempt to solve this problem by limiting the size of the memory table to keep the search cost down, but this can add cost to the disk-writes and increase a number of disk-writes performed. Other conventional methods may keep the data unsorted in the memory table and use a hash table to reduce the search cost. But, keeping key-value pairs unsorted in the memory table involves a full sort of the key-value pairs when the memory table is full and needs to be written to the disk storage device. Sorting the memory table can cost N*Log(N) operations. Thus, for a memory table with millions of key-value pairs, sorting and migrating the key-value pairs can be expensive and cause service delays and spikes in the response time.

Some examples of the present disclosure can overcome one or more of the abovementioned problems by providing a system with a caching layer in front of a memory table of a database. The system can receive, at an unsorted data structure of the caching layer, a key-value pair associated with a data object. The unsorted data structure can store a first number of key-value pairs. The system can receive one or more operations for updating the key-value pair in the caching layer. For example, the system may receive three updates to the key-value pair. When the caching layer becomes full and an additional key-value pair is received that is to be stored in the caching layer, the system can use a caching algorithm to determine the key-value pair is to be migrated. The system can then migrate the key-value pair to a sorted memory table that stores a second number of key-value pairs that is larger than the first number of key-value pairs. The system can sort the key-value pair with the key-value pairs stored in the sorted memory table prior to storing the key-value pair in the sorted memory table. The caching layer can allow updates for key-value pairs that are associated with a higher likelihood of receiving operations to be performed quickly and less expensively before the key-value pairs are moved to the memory table. Additionally, since the key-value pairs are kept sorted in the memory table, moving the key-value pairs to the disk storage device can also be performed more quickly and less expensively.

As one example, a system can receive a key-value pair at a caching layer of a log structured merge database. The system can then receive operations for updating the key-value pair in the caching layer. Since the caching layer can be a hash table with direct access, the operations can be serviced quickly. After the caching layer is full and receives an additional key-value pair that is to be stored in the caching layer, the system can determine that the key-value pair is no longer "hot", and thus a likelihood of receiving additional operations is reduced. The system can determine the key-value pair is no longer hot based on a caching algorithm, such as a least-recently-used (LRU) algorithm. As a result, the system can migrate the key-value pair to a memory table of the log structured merge database that stores key-value pairs sorted. When the memory table is full, the system can migrate the sorted key-value pairs from the memory table and the unsorted key-value pairs from the caching layer to a disk storage device of the database. Since only the unsorted key-value pairs need to be sorted, the migration can occur more quickly than if the memory table were unsorted.

As another example, a system may implement a caching layer to have a dynamic size to adapt to the amount of key-value pairs that receive operations in the database. With a first number of key-value pairs stored in the caching layer and a second number of key-value pairs stored in a sorted memory table, the system can determine a number of the key-value pairs in the sorted memory table that receive operations. Since operations can be performed more quickly for key-value pairs in the caching layer, it may be advantageous for the caching layer to have a size large enough to accommodate a majority of the key-value pairs that receive operations in the database. So, the system can output a command to change the size of the caching layer so that the caching layer can store the first number of key-value pairs along with the number of key-value pairs in the sorted memory table that receive operations.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for implementing a caching layer 130 for key-value storage according to some aspects of the present disclosure. The system 100 includes a client device 102 in communication with a processor 110 and a memory device 120, which are in communication with a disk storage device 150. The processor 110, the memory device 120, and the disk storage device 150 may be part of the client device 102, or may be accessible by the client device 102 via one or more networks, such as a local area network or the Internet. Examples of the client device 102 include a laptop, desktop, mobile device, or other computing device.

The memory device 120 can include a sorted memory table 140 as part of a database storage, such as a log structured merge database. The sorted memory table 140 may be a skip list, a binary search tree, or another sorted data structure. The disk storage device 150 can additionally be part of the database storage. For example, key-value pairs 144 stored in the sorted memory table 140 can be moved to the disk storage device 150 when the sorted memory table 140 is full. The key-value pairs 144 can be stored sorted in the disk storage device 150. In some examples, the memory device 120 additionally includes the caching layer 130 in front of the sorted memory table 140 as part of the database storage. With the caching layer 130 in front of the sorted memory table 140, key-value pairs that are to be stored in the database can be initially received by and stored in the caching layer 130 prior to being stored in the sorted memory table 140. The caching layer 130 can include an unsorted data structure 132 for storing key-value pairs 134. Thus, each key-value pair of the key-value pairs 144 may have been previously stored in the caching layer 130.

The client device 102 can perform an operation 104, such as a write request, for storing a key-value pair 136 associated with a data object in the database. The unsorted data structure 132 of the caching layer 130 can receive the key-value pair 136 in response to the operation 104. The unsorted data structure 132 may be capable of storing a first number of key-value pairs that is less than a second number of key-value pairs that the sorted memory table 140 is capable of storing. For example, the unsorted data structure 124 may be capable of storing one-thousand key-value pairs and the sorted memory table 140 may be capable of storing one-million key-value pairs.

In some examples, while the key-value pair 136 is stored in the caching layer 130, the caching layer 130 can receive additional operations for updating the key-value pair 136 in the caching layer 130. Since the key-value pairs 134 are unsorted in the caching layer 130, the additional operations can be performed quickly. After a predefined time 112 passes since an operation is received for the key-value pair 136, the processor 110 can migrate the key-value pair 136 to the sorted memory table 140. For example, the predefined time 112 may be ten seconds, and once ten seconds passes from an operation being received by the caching layer 130 to update the key-value pair 136, the processor 110 can migrate the key-value pair 136 to the sorted memory table 140. To store the key-value pair 136 in the sorted memory table, the processor 110 can sort the key-value pair 136 with the key-value pairs 144 in the sorted memory table 140.

In some examples, the processor 110 may use a caching algorithm 113 to determine which key-value pair of the key-value pairs 134 to migrate to the sorted memory table 140. For example, the caching algorithm 113 may be a least-recently-used (LRU) algorithm. At a time when the caching layer 130 is full and an additional key-value pair is to be stored in the caching layer 130, the processor 110 can determine which key-value pair of the key-value pairs 134 has been least-recently used based on the caching algorithm 113. The processor 110 can migrate the key-value pair that was least-recently used from the unsorted data structure 132 to the sorted memory table 140.

In some examples, the unsorted data structure 132 may be a first-in-first-out (FIFO) list with a corresponding hash table for quick access of data objects associated with the key-value pairs in the FIFO list. Once the unsorted data structure 132 stores a number of key-value pairs equal to a number of key-value pairs the unsorted data structure 132 is capable of storing, the unsorted data structure 132 can be considered full. If the caching layer 130 then receives an additional key-value pair, such as the key-value pair 136, the processor 110 can determine which key-value pair of the key-value pairs 134 was least-recently added to the unsorted data structure 132. The processor 110 can migrate the key-value pair that was least-recently added from the unsorted data structure 132 to the sorted memory table 140. The key-value pair 136 can then be stored in the unsorted data structure 132.

The caching layer 130 may have a static size, or the size of the caching layer 130 may be dynamic. The size of the caching layer 130 can correspond to the number of key-value pairs that the caching layer 130 is capable of storing. For example, if the number of key-value pairs that the caching layer 130 is capable of storing cannot be changed, then the size can be considered static. If the size of the caching layer 130 is dynamic, the number of key-value pairs capable of being stored in the caching layer 130 may be based on a cache hit ratio 114 for the key-value pairs 134 stored in the caching layer 130. The processor 110 can determine the cache hit ratio 114 for the key-value pairs 134 based on whether a key-value pair is stored in the caching layer 130 at a time when an operation is received for updating the key-value pair. If the cache hit ratio is below a threshold 118a, the processor 110 can determine that the caching layer 130 should increase in size so that there is a higher likelihood a key-value pair associated with an operation is stored in the caching layer 130 rather than the sorted memory table 140 or the disk storage device 150. There may additionally be an upper threshold, and if the processor 110 determines the cache hit ratio exceeds the upper threshold, the processor 110 can determine that the caching layer 130 should decrease in size. The processor 110 can then determine the number of key-value pairs that the caching layer 130 should be capable of storing based on the cache hit ratio 114. The processor 110 can output a command 106 to change a size of the caching layer 130. The size may be automatically adjusted based on the command 106.

The processor 110 may alternatively determine what the size of the caching layer 130 should be based on a number of key-value pairs 116 of the sorted memory table 140 that receive operations. These operations may be less efficient and time consuming for the system 100 since the caching layer 130 is searched first for the desired key-value pair prior to the sorted memory table 140 being sorted. Thus, efficiency of the system 100 can be improved if a higher number of key-value pairs that receive operations are stored in the caching layer 130. The processor 110 can determine the number of key-value pairs 116 of the sorted memory table 140 that receive operations and then output the command 106 to change the size of the caching layer 130 to include a current number of key-value pairs that the caching layer 130 is capable of storing plus the number of key-value pairs 116 in the sorted memory table 140 that receive operations. The number of key-value pairs 116 may be an average number taken over multiple time periods. For example, each time period may be ten seconds, and the processor 110 may determine an average number of key-value pairs in the sorted memory table 140 that receive operations each ten seconds over another time period, such as a minute. The number of key-value pairs 116 can be determined to be the average number for the ten second intervals.

In some examples, the processor 110 may use the cache hit ratio 114 to determine one or more data structures in the caching layer 130 to disable. For example, the unsorted data structure 132 may be a first data structure in the caching layer 130, and there may be additional data structures also in the caching layer. The processor 110 can determine the cache hit ratio 114 for key-value pairs in each data structure of the caching layer. If the cache hit ratio 114 for a data structure is below a threshold 118b, the processor 110 may disable the data structure. For example, if the cache hit ratio 114 for the unsorted data structure 132 is below the threshold 118b, the unsorted data structure 132 can be disabled. Disabling the unsorted data structure 132 can mean that any key-value pairs that otherwise are initially be stored in the unsorted data structure 132 instead bypass the caching layer 130 and be initially stored in the sorted memory table 140. Individual data structures of the caching layer 130 may be disabled, the entirety of the caching layer 130 may be disabled based on the cache hit ratio 114.

At a time when the sorted memory table 140 is full, and thus cannot store any additional key-value pairs, the key-value pairs 144 and the key-value pairs 134 can be migrated to the disk storage device 150. Since the key-value pairs 134 are stored unsorted in the caching layer 130, the processor 110 can sort the key-value pairs 134 to generate a first sorted list of key-value pairs. The key-value pairs 144 are already stored sorted in the sorted memory table 140, so the processor 110 can receive a second sorted list of key-value pairs associated with the key-value pairs 144. The processor 110 can then merge the first sorted list and the second sorted list to generate a third sorted list 152. The processor 110 can store the key-value pairs 134 and the key-value pairs 144 in the disk storage device 150 based on the third sorted list 152. Since only a portion of the key-value pairs that are being migrated to the disk storage device 150 have to be sorted, the migration can be performed more quickly than if a memory table stored the key-value pairs 144 unsorted.

Although FIG. 1 depicts a certain number and arrangement of components, other examples may include more components, fewer components, different components, or a different number of the components that is shown in FIG. 1. For instance, the system 100 can include more or fewer data structures than are shown in FIG. 1. Additionally, while migrating a key-value pair from the caching layer 130 to the sorted memory table 140 is described with respect to a predefined time passing or the key-value pair being least-recently added to the caching layer in FIG. 1, in other examples a least-recently accessed or least frequently accessed key-value pair may be migrated to the stored memory table 140. Although disabling data structures or a caching layer and determining a size of the caching layer are described with respect to a cache hit ratio in FIG. 1, other examples may use other measurements associated with key-value pairs.

Figure 2:
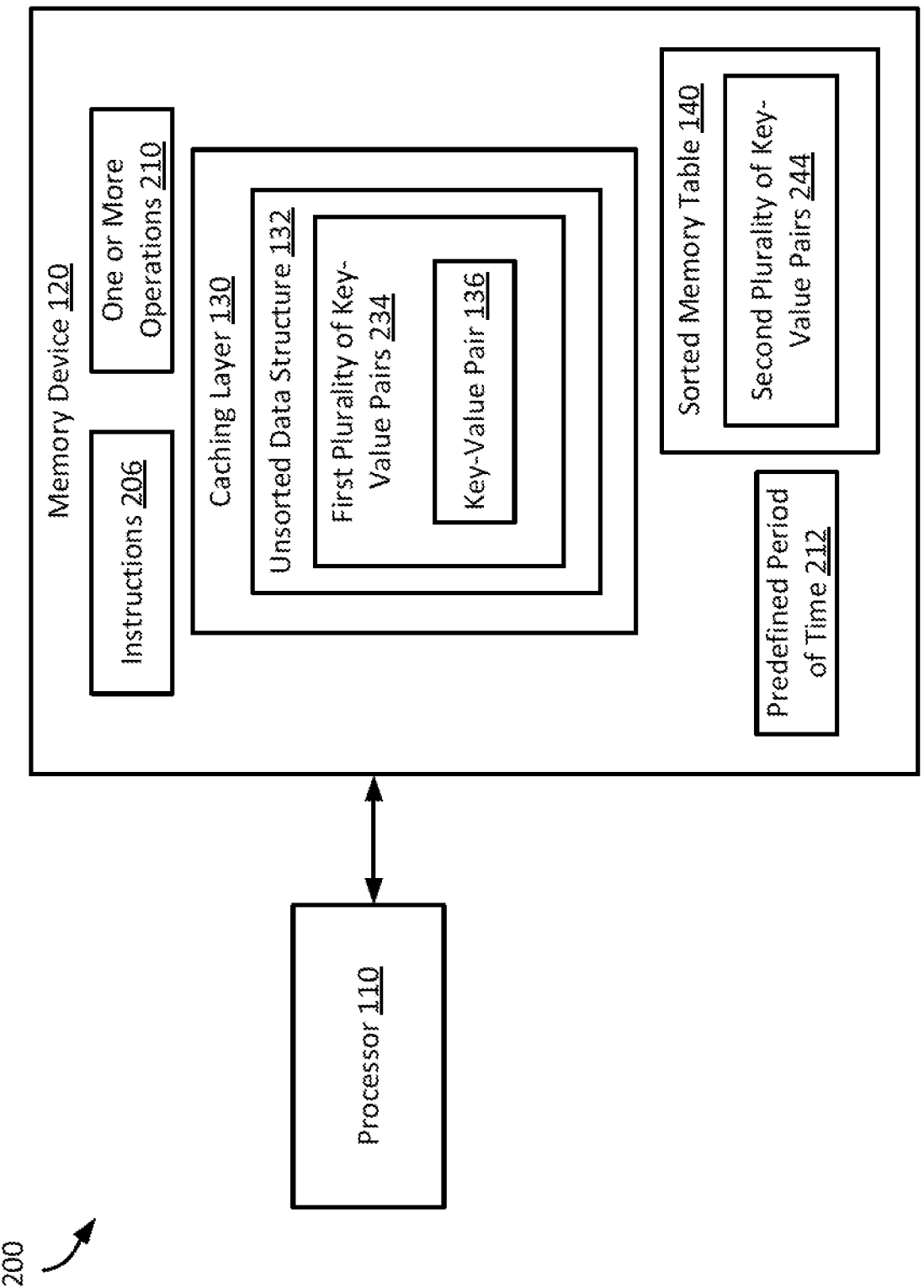
FIG. 2 shows a block diagram of another example of a system for implementing a caching layer for key-value storage in a database according to some aspects of the present disclosure.

FIG. 2 shows a block diagram of another example of system 200 for implementing a caching layer 130 for key-value storage in a database according to some aspects of the present disclosure. The system 200 can be a distributed computing environment, in some examples. The system 200 includes a processor 110 that is communicatively coupled to a memory device 120. In some examples, the processor 110 and the memory device 120 can be part of the same computing device. In other examples, the processor 110 and the memory device 120 can be distributed from (e.g., remote to) one another.

The processor 110 can include one processor or multiple processors. Non-limiting examples of the processor 302 include a Field-Programmable Gate Array (FPGA), an application-specific integrated circuit (ASIC), or a microprocessor. The processor 302 can execute instructions 206 stored in the memory device 120 to perform operations. The instructions 206 may include processor-specific instructions generated by a compiler or an interpreter from code written in any suitable computer-programming language, such as C, C++, C#, Java, or Python.

The memory device 120 can include one memory or multiple memories. The memory device 120 can be volatile or non-volatile. Non-volatile memory includes any type of memory that retains stored information when powered off. Examples of the memory device 120 include electrically erasable and programmable read-only memory (EEPROM) or flash memory. At least some of the memory device 120 can include a non-transitory computer-readable medium from which the processor 110 can read instructions 206. A non-transitory computer-readable medium can include electronic, optical, magnetic, or other storage devices capable of providing the processor 110 with computer-readable instructions or other program code. Examples of a non-transitory computer-readable medium can include a magnetic disk, a memory chip, ROM, random-access memory (RAM), an ASIC, a configured processor, and optical storage.

The processor 110 can execute the instructions 206 to perform operations. For example, the processor 110 can receive, at an unsorted data structure 132 of a caching layer 130, a key-value pair 136 associated with a data object. The unsorted data structure 132 can store a first plurality of key-value pairs 234. The processor 110 can receive one or more operations 210 for updating the key-value pair 136 in the caching layer 130. For example, the one or more operations 210 may be write operations for the data object. The processor 110 can determine, with the caching layer 130 being full and an additional key-value pair 137 being received to be stored in the caching layer 130, the key-value pair 136 is to be migrated to a sorted memory table 140 based on a caching algorithm 113. The caching algorithm 113 may be a LRU algorithm, and a likelihood of additional operations being received for a least-recently used key-value pair can be low, so the processor 110 can migrate the key-value pair 136 to a sorted memory table 140 configured to store a second plurality of key-value pairs 244 that is larger than the first plurality of key-value pairs 234. For example, if the caching layer 130 stores one hundred key-value pairs, the sorted memory table 140 may store one thousand key-value pairs. Since the second plurality of key-value pairs 244 are stored sorted in the sorted memory table 140, the processor 110 can sort the key-value pair 136 with the second plurality of key-value pairs 244 prior to storing the key-value pair in the sorted memory table 140.

Each key-value pair of the second plurality of key-value pairs 244 can be stored in the caching layer 130 prior to being stored in the sorted memory table 140.

Figure 3:
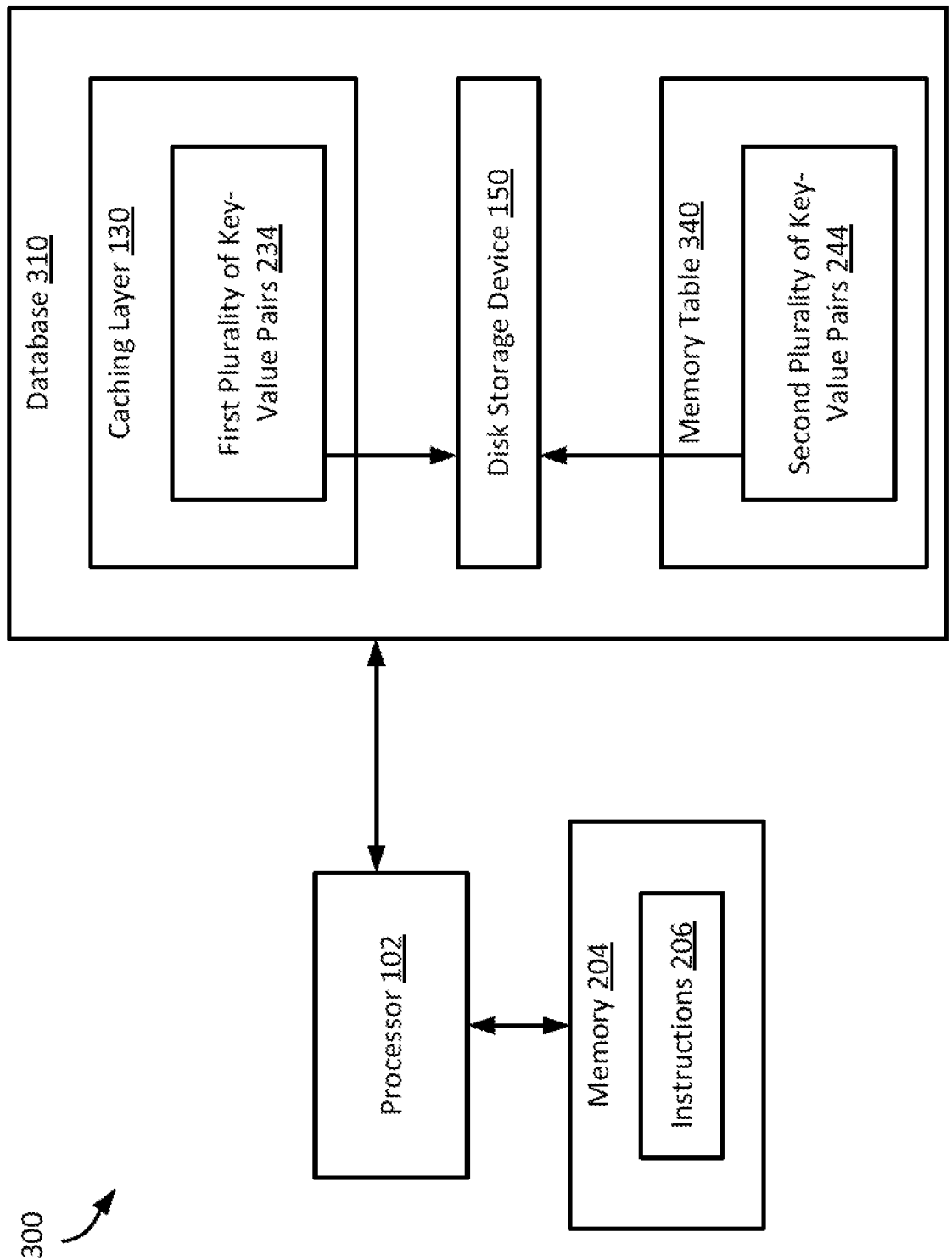
FIG. 3 shows a block diagram of an example of a system for implementing a caching layer for key-value storage in a database according to some aspects of the present disclosure.

FIG. 3 shows a block diagram of another example of a system 300 for implementing a caching layer 130 for key-value storage in a database 310 according to some aspects of the present disclosure. The system 300 may be a distributed computing system, in some examples. The system 300 includes a processor 110 communicatively coupled to a database 310 and a memory 204. The processor 110 can execute instructions (e.g., instructions 206 of FIG. 2) stored in memory 204 to perform operations, such as any of the operations described herein.

For example, the processor 110 can migrate, to a disk storage device 150 of a database 310, a first plurality of key-value pairs 234 from a caching layer 130 of the database 310 and a second plurality of key-value pairs 244 from a memory table 340 of the database 310. The caching layer 130 can sit in front of the memory table 340 in the database 310, such that key-value pairs that are received by the database 310 are initially stored in the caching layer 130. The first plurality of key-value pairs 234 can be unsorted in the caching layer 130 and the second plurality of key-value pairs 244 can be sorted in the memory table 340. Storing the first plurality of key-value pairs 234 can allow for operations associated with the first plurality of key-value pairs 234 to be performed more quickly. Each key-value pair of the second plurality of key-value pairs 244 may have previously been stored in the caching layer 130 prior to being stored in the memory table 340. Each of the key-value pairs of the second plurality of key-value pairs 244 may have been migrated from the caching layer 130 to the memory table 340 according to a caching algorithm. The processor 110 can sort the first plurality of key-value pairs 234 with the second plurality of key-value pairs 244 and store the first plurality of key-value pairs 234 and the second plurality of key-value pairs 244 sorted in the disk storage device 150.

Figure 4:
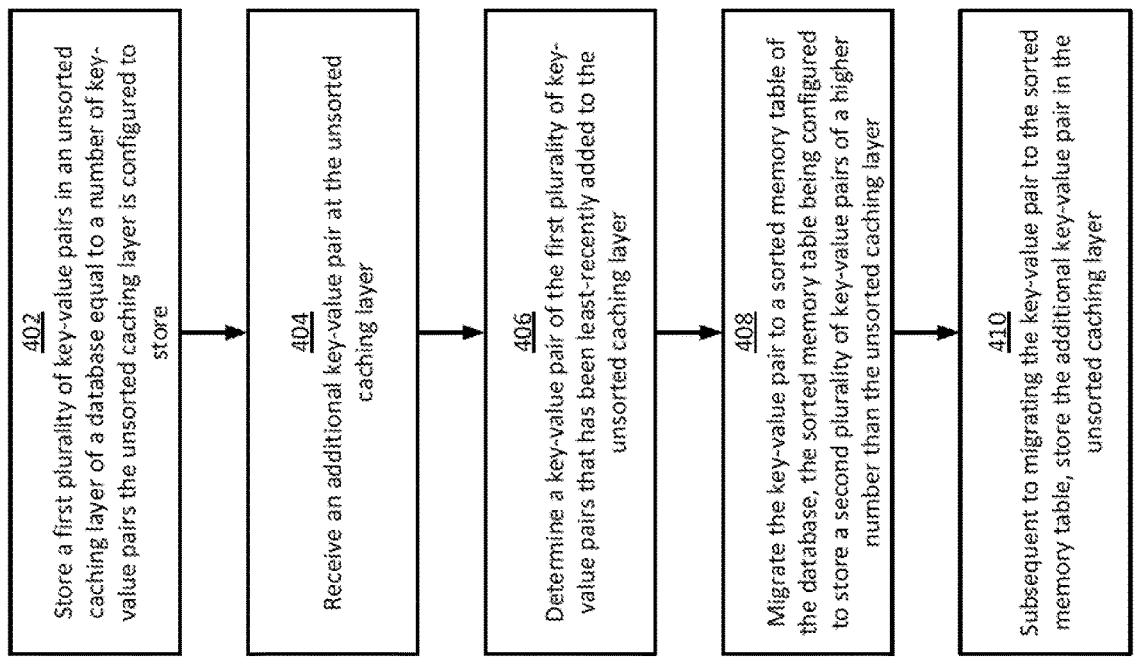
FIG. 4 shows a block diagram of another example of a system for implementing a caching layer for key-value storage in a database according to some aspects of the present disclosure.

FIG. 4 shows a flow chart of an example of a process for implementing a caching layer for key-value storage in a database according to some aspects of the present disclosure. Other examples can include more steps, fewer steps, different steps, or a different order of the steps than is shown in FIG. 4. The steps of FIG. 4 are discussed below with reference to the components discussed above in relation to FIGS. 2-3.

In block 402, a database 310 stores a first plurality of key-value pairs 234 in an unsorted caching layer (e.g., caching layer 130) of the database 310. The first plurality of key-value pairs 234 can equal a number of key-value pairs the unsorted caching layer is configured to store. For example, if the unsorted caching layer is configured to store one thousand key-value pairs, the unsorted caching layer can be full when the first plurality of key-value pairs 234 equals one thousand.

In block 404, the database 310 receives an additional key-value pair (e.g., key-value pair 136) at the unsorted caching layer. The database 310 may receive the additional key-value pair as a result of a write request for the key-value pair.

In block 406, the database 310 determines a key-value pair of the first plurality of key-value pairs 234 that was least-recently added to the unsorted caching layer. For example, each key-value pair can include a timestamp indicating a time when the key-value pair was added to the unsorted caching layer, and the database 310 can determine which timestamp is the least recent. In other examples, the database 310 may determine a key-value pair that was least-recently accessed or is least-frequently accessed in the unsorted caching layer.

In block 408, the database 310 migrates the key-value pair to a sorted memory table 140 of the database 310. The sorted memory table 140 can be configured to store a second plurality of key-value pairs 244 of a higher number than the unsorted caching layer. The key-value pair can be sorted with the second plurality of key-value pairs 244 prior to being stored in the sorted memory table 140.

In block 410, the database 310, subsequent to migrating the key-value pair to the sorted memory table 140, stores the additional key-value pair in the unsorted caching layer. With the additional key-value pair stored in the unsorted caching layer, operations associated with the additional key-value pair can be received and performed quickly during a time in which operations are more likely to be received for the additional key-value pair.

Figure 5:
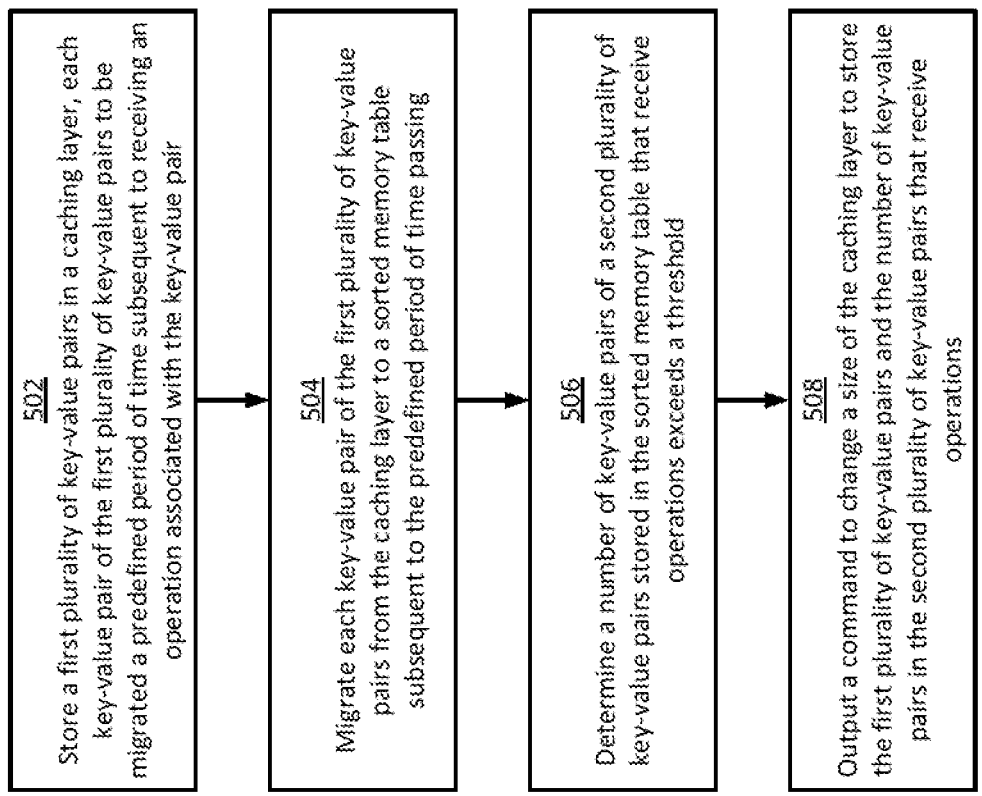
FIG. 5 shows a flow chart of an example of a process for implementing a caching layer for key-value storage in a database according to some aspects of the present disclosure.

FIG. 5 shows a flow chart of another example of a process for implementing a caching layer for key-value storage in a database according to some aspects of the present disclosure. Other examples can include more steps, fewer steps, different steps, or a different order of the steps than is shown in FIG. 5. The steps of FIG. 5 are discussed below with reference to the components discussed above in relation to FIGS. 2-3.

In block 502, a processor 110 stores a first plurality of key-value pairs 234 in a caching layer 130. Each key-value pair of the first plurality of key-value pairs 234 can be migrated according to a caching algorithm 113. For example, the caching algorithm 113 may be an LRU algorithm, and each key-value pair of the first plurality of key-value pairs 234 can be migrated based on the LRU algorithm.

In block 504, the processor 110 migrates each key-value pair of the first plurality of key-value pairs 234 from the caching layer 130 to the sorted memory table 140 based on the caching algorithm 113. The processor 110 may use timestamps associated with operations received for each key-value pair to determine the least-recently used key-value pair that is to be migrated to the sorted memory table 140.

In block 506, the processor 110 determines a number of key-value pairs of a second plurality of key-value pairs 244 stored in the sorted memory table 140 that receive operations 210 exceeds a threshold. For example, if the second plurality of key-value pairs 244 is one thousand key-value pairs, the processor 110 may determine that one hundred of the key-value pairs receive operations. The threshold may be fifty key-value pairs, so the processor 110 can determine that the number exceeds the threshold. The processor 110 may take an average number of key-value pairs over multiple intervals of time to determine that the number exceeds the threshold.

In block 508, the processor 110 outputs a command to change a size of the caching layer 130 to store the first plurality of key-value pairs 234 and the number of key-value pairs in the second plurality of key-value pairs 244 that receive operations. For example, if the number of key-value pairs that receive operations is one hundred and the first plurality of key-value pairs 234 is two hundred, the processor 110 can output the command to change the size of the caching layer 130 to store three hundred key-value pairs. Since operations for key-value pairs stored in the caching layer 130 can be performed more quickly than operations for key-value pairs stored in the sorted memory table 140, adjusting the size of the caching layer 130 may ensure that the system 200 operates as efficiently as possible.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory device including instructions that are executable by the processor for causing the processor to: receive, at an unsorted data structure of a caching layer, a key-value pair associated with a data object, the unsorted data structure storing a first plurality of key-value pairs; receive one or more operations for updating the key-value pair in the caching layer; determine, with the caching layer being full and an additional key-value pair being received to be stored in the caching layer, the key-value pair is to be migrated to a sorted memory table based on a caching algorithm; migrate the key-value pair to the sorted memory table configured to store a second plurality of key-value pairs that is larger than the first plurality of key-value pairs; and sort the key-value pair with the second plurality of key-value pairs prior to storing the key-value pair in the sorted memory table.

Example 2 is the system of example 1, wherein the memory device further includes instructions that are executable by the processor for causing the processor to: determine the sorted memory table stores the second plurality of key-value pairs; and migrate the second plurality of key-value pairs from the sorted memory table and the first plurality of key-value pairs from the unsorted data structure to a disk storage device.

Example 3 is the system of example 2, wherein the memory device further includes instructions that are executable by the processor for causing the processor to migrate the second plurality of key-value pairs and the first plurality of key-value pairs to the disk storage device by: sorting the first plurality of key-value pairs from the unsorted data structure to generate a first sorted list of key-value pairs; receiving a second sorted list of key-value pairs for the second plurality of key-value pairs from the sorted memory table; merging the first sorted list and the second sorted list to generate a third sorted list of key-value pairs that includes the first plurality of key-value pairs and the second value of key-value pairs; and storing the first plurality of key-value pairs and the second plurality of key-value pairs in the disk storage device based on the third sorted list of key-value pairs.

Example 4 is the system of example(s) 1-3, wherein each key-value pair of the second plurality of key-value pairs has been previously stored in the unsorted data structure prior to being stored in the sorted memory table.

Example 5 is the system of example(s) 1-4, wherein the memory device further includes instructions that are executable by the processor for causing the processor to: determine a cache hit ratio associated with the first plurality of key-value pairs is below a threshold; and disable the caching layer so that subsequent key-value pairs are received by the sorted memory table without previously being stored in the caching layer.

Example 6 is the system of example(s) 1-5, wherein the memory device further includes instructions that are executable by the processor for causing the processor to: determine a number of the second plurality of key-value pairs that receive operations exceeds a threshold; and change a size of the unsorted data structure to store the first plurality of key-value pairs and the number of the second plurality of key-value pairs that receive the operations.

Example 7 is the system of example(s) 1-6, wherein a size of the unsorted data structure is static.

Example 8 is a method comprising: storing a first plurality of key-value pairs in an unsorted caching layer of a database equal to a number of key-value pairs the unsorted caching layer is configured to store; receiving an additional key-value pair at the unsorted caching layer; determining a key-value pair of the first plurality of key-value pairs that has been least-recently added to the unsorted caching layer; migrating the key-value pair to a sorted memory table of the database, the sorted memory table configured to store a second plurality of key-value pairs of a higher number than the unsorted caching layer; and subsequent to migrating the key-value pair to the sorted memory table, storing the additional key-value pair in the unsorted caching layer.

Example 9 is the method of example 8, further comprising: determining the sorted memory table is full; and migrating the second plurality of key-value pairs in the sorted memory table and the first plurality of key-value pairs in the unsorted caching layer to a disk storage device.

Example 10 is the method of example 9, wherein migrating the second plurality of key-value pairs and the first plurality of key-value pairs to the disk storage device comprises: sorting the first plurality of key-value pairs from the unsorted caching layer to generate a first sorted list of key-value pairs; receiving a second sorted list of key-value pairs for the second plurality of key-value pairs from the sorted memory table; merging the first sorted list and the second sorted list to generate a third sorted list of key-value pairs that includes the first plurality of key-value pairs and the second value of key-value pairs; and storing the first plurality of key-value pairs and the second plurality of key-value pairs in the disk storage device based on the third sorted list of key-value pairs.

Example 11 is the method of example(s) 8-10, wherein each key-value pair of the second plurality of key-value pairs has been previously stored in the unsorted caching layer prior to being stored in the sorted memory table.

Example 12 is the method of example(s) 8-11, further comprising: determining a cache-hit ratio associated with the first plurality of key-value pairs is below a threshold; and disabling the unsorted caching layer so that subsequent key-value pairs are received by the sorted memory table without previously being stored in the unsorted caching layer.

Example 13 is the method of example(s) 8-12, further comprising: determining a number of the second plurality of key-value pairs that receive operations exceeds a threshold; and changing a size of the unsorted caching layer to store the first plurality of key-value pairs and the number of the second plurality of key-value pairs that receive the operations.

Example 14 is a non-transitory computer-readable medium comprising program code executable by a processor for causing the processor to: receive, at a disk storage device of a database, a first plurality of key-value pairs from a caching layer of the database and a second plurality of key-value pairs from a memory table of the database, the first plurality of key-value pairs being unsorted in the caching layer and the second plurality of key-value pairs being sorted in the memory table, and each key-value pair of the second plurality of key-value pairs previously being stored in the caching layer prior to being stored in the memory table; sort the first plurality of key-value pairs with the second plurality of key-value pairs; and store the first plurality of key-value pairs and the second plurality of key-value pairs sorted in the disk storage device.

Example 15 is the non-transitory computer-readable medium of example 14, further comprising program code that is executable by the processor for causing the processor to sort the first plurality of key-value pairs with the second plurality of key-value pairs by: sorting the first plurality of key-value pairs from the caching layer to generate a first sorted list of key-value pairs; receiving a second sorted list of key-value pairs for the second plurality of key-value pairs from the memory table; merging the first sorted list and the second sorted list to generate a third sorted list of key-value pairs that includes the first plurality of key-value pairs and the second value of key-value pairs; and storing the first plurality of key-value pairs and the second plurality of key-value pairs in the disk storage device based on the third sorted list of key-value pairs.

Example 16 is the non-transitory computer-readable medium of example(s) 14-15, further comprising program code that is executable by the processor for causing the processor to: determine a cache-hit ratio associated with the first plurality of key-value pairs is below a threshold; and disable the caching layer so that subsequent key-value pairs are received by the memory table without previously being stored in the caching layer.

Example 17 is the non-transitory computer-readable medium of example(s) 14-16, further comprising program code that is executable by the processor for causing the processor to: determine a number of the second plurality of key-value pairs that receive operations exceeds a threshold; and change a size of the caching layer to store the first plurality of key-value pairs and the number of the second plurality of key-value pairs that receive the operations.

Example 18 is the non-transitory computer-readable medium of example(s) 14-17, further comprising program code that is executable by the processor for causing the processor to: determine a key-value pair of the first plurality of key-value pairs is to be migrated based on a caching algorithm; and migrate the key-value pair to the memory table by sorting the key-value pair with the second plurality of key-value pairs.

Example 19 is the non-transitory computer-readable medium of example(s) 14-18, wherein the disk storage device receives the first plurality of key-value pairs and the second plurality of key-value pairs in response to the memory table being full.

Example 20 is the non-transitory computer-readable medium of example(s) 14-19, wherein a size of the caching layer is static.

Example 21 is a method comprising: storing a first plurality of key-value pairs at a caching layer, each key-value pair of the first plurality of key-value pairs to be migrated to a memory table based on a caching algorithm; determining a cache hit ratio associated with the first plurality of key-value pairs is below a threshold; and disabling the caching layer so that subsequent key-value pairs are received by the memory table.

Example 22 is the method of example 21, wherein migrating the key-value pair from the caching layer to the memory table comprises: determining the key-value pair is to be migrated based on the caching algorithm; and migrating the key-value pair to the memory table by sorting the key-value pair with a second plurality of key-value pairs stored in the memory table.

Example 23 is the method of example 22, wherein the second plurality of key-value pairs are sorted in the memory table prior to the memory table receiving the key-value pair from the caching layer.

Example 24 is the method of example 22, further comprising: determining the memory table is full; and migrating the second plurality of key-value pairs in the memory table and the first plurality of key-value pairs in the caching layer to a disk storage device.

Example 25 is the method of example 24, wherein migrating the second plurality of key-value pairs and the first plurality of key-value pairs to the disk storage device comprises: sorting the first plurality of key-value pairs from the caching layer to generate a first sorted list of key-value pairs; receiving a second sorted list of key-value pairs for the second plurality of key-value pairs from the memory table; merging the first sorted list and the second sorted list to generate a third sorted list of key-value pairs that includes the first plurality of key-value pairs and the second value of key-value pairs; and storing the first plurality of key-value pairs and the second plurality of key-value pairs in the disk storage device based on the third sorted list of key-value pairs.

Example 26 is a system comprising: first storage means for storing a first plurality of key-value pairs, each key-value pair of the first plurality to be migrated based on a caching algorithm; second storage means for receiving each key-value pair of the first plurality of key-value pairs from the first storage means; and processing means for performing computing operations comprising: determining a number of key-value pairs of a second plurality of key-value pairs stored in the second storage means that receive operations exceeds a threshold; and outputting a command to change a size of the first storage means to store the first plurality of key-value pairs and the number of key-value pairs in the second plurality of key-value pairs that receive the operations.

Example 27 is the system of example 26, wherein the size of the first storage means is configured to automatically change based on the number of key-value pairs in the second plurality of key-value pairs that receive operations.

Example 28 is the system of example(s) 26-27, wherein the processing means further performs computing operations to migrate the key-value pair from the first storage means to the second storage means by: determining the key-value pair is to be migrated based on the caching algorithm; and migrating the key-value pair to the second storage means by sorting the key-value pair with the second plurality of key-value pairs stored in the second storage means.

Example 29 is the system of example(s) 26-28, further comprising: a third storage means for storing key-value pairs subsequent to the key-value pairs being stored in the first storage means or the second storage means, wherein the processing means further performs computing operations comprising: determining the second storage means is full; and migrating the second plurality of key-value pairs in the second storage means and the first plurality of key-value pairs in the first storage means to the third storage means.

Example 30 is the system of example 29, migrating the second plurality of key-value pairs and the first plurality of key-value pairs to the third storage means comprises: sorting the first plurality of key-value pairs from the first storage means to generate a first sorted list of key-value pairs; receiving a second sorted list of key-value pairs for the second plurality of key-value pairs from the second storage means; merging the first sorted list and the second sorted list to generate a third sorted list of key-value pairs that includes the first plurality of key-value pairs and the second value of key-value pairs; and storing the first plurality of key-value pairs and the second plurality of key-value pairs in the third storage means based on the third sorted list of key-value pairs.

Example 31 is a non-transitory computer-readable medium comprising program code executable by a processor for causing the processor to: store a first plurality of key-value pairs in a caching layer, each key-value pair of the first plurality of key-value pairs to be migrated according to a caching algorithm; migrate each key-value pair of the first plurality of key-value pairs from the caching layer to a sorted memory table based on the caching algorithm; determine a number of key-value pairs of a second plurality of key-value pairs stored in the sorted memory table that receive operations exceeds a threshold; and output a command to change a size of the caching layer to store the first plurality of key-value pairs and the number of key-value pairs in the second plurality of key-value pairs that receive the operations.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory device including instructions that are executable by the processor for causing the processor to:
receive, at an unsorted data structure of a caching layer, a key-value pair associated with a data object, the unsorted data structure storing a first plurality of key-value pairs;
receive one or more operations for updating the key-value pair in the caching layer;
determine, with the caching layer being full and an additional key-value pair being received to be stored in the caching layer, the key-value pair is to be migrated to a sorted memory table based on a caching algorithm;
migrate the key-value pair to the sorted memory table configured to store a second plurality of key-value pairs that is larger than the first plurality of key-value pairs, a size of the caching layer being adjustable based on a number of the second plurality of key-value pairs that receive operations; and
sort the key-value pair with the second plurality of key-value pairs prior to storing the key-value pair in the sorted memory table.

2. The system of claim 1, wherein the memory device further includes instructions that are executable by the processor for causing the processor to:
determine the sorted memory table stores the second plurality of key-value pairs; and
migrate the second plurality of key-value pairs from the sorted memory table and the first plurality of key-value pairs from the unsorted data structure to a disk storage device.

3. The system of claim 2, wherein the memory device further includes instructions that are executable by the processor for causing the processor to migrate the second plurality of key-value pairs and the first plurality of key-value pairs to the disk storage device by:

sorting the first plurality of key-value pairs from the unsorted data structure to generate a first sorted list of key-value pairs;
receiving a second sorted list of key-value pairs for the second plurality of key-value pairs from the sorted memory table;
merging the first sorted list and the second sorted list to generate a third sorted list of key-value pairs that includes the first plurality of key-value pairs and the second value of key-value pairs; and
storing the third sorted list of key-value pairs in the disk storage device.

4. The system of claim 1, wherein each key-value pair of the second plurality of key-value pairs has been previously stored in the unsorted data structure prior to being stored in the sorted memory table.

5. The system of claim 1, wherein the memory device further includes instructions that are executable by the processor for causing the processor to:
determine a cache hit ratio associated with the first plurality of key-value pairs is below a threshold; and
in response to determining the cache hit ratio is below the threshold, disable the caching layer so that subsequent key-value pairs are received by the sorted memory table without previously being stored in the caching layer.

6. The system of claim 1, wherein the memory device further includes instructions that are executable by the processor for causing the processor to:
determine the number of the second plurality of key-value pairs that receive operations exceeds a threshold; and
in response to determining the number of the second plurality of key-value pairs that receive operations exceeds the threshold, change a size of the unsorted data structure to store the first plurality of key-value pairs and the number of the second plurality of key-value pairs that receive the operations.

7. The system of claim 1, wherein a size of the unsorted data structure is static.

8. A method comprising:
storing a first plurality of key-value pairs in an unsorted caching layer of a database equal to a number of key-value pairs the unsorted caching layer is configured to store;
receiving an additional key-value pair at the unsorted caching layer;
determining a key-value pair of the first plurality of key-value pairs that has been least-recently added to the unsorted caching layer;
migrating the key-value pair to a sorted memory table of the database, the sorted memory table configured to store a second plurality of key-value pairs of a higher number than the unsorted caching layer, a size of the caching layer being adjustable based on a number of the second plurality of key-value pairs that receive operations; and
subsequent to migrating the key-value pair to the sorted memory table, storing the additional key-value pair in the unsorted caching layer.

9. The method of claim 8, further comprising:
determining the sorted memory table is full; and
migrating the second plurality of key-value pairs in the sorted memory table and the first plurality of key-value pairs in the unsorted caching layer to a disk storage device.

10. The method of claim 9, wherein migrating the second plurality of key-value pairs and the first plurality of key-value pairs to the disk storage device comprises:
   sorting the first plurality of key-value pairs from the unsorted caching layer to generate a first sorted list of key-value pairs;
   receiving a second sorted list of key-value pairs for the second plurality of key-value pairs from the sorted memory table;
   merging the first sorted list and the second sorted list to generate a third sorted list of key-value pairs that includes the first plurality of key-value pairs and the second value of key-value pairs; and
   storing the third sorted list of key-value pairs in the disk storage device.

11. The method of claim 8, wherein each key-value pair of the second plurality of key-value pairs has been previously stored in the unsorted caching layer prior to being stored in the sorted memory table.

12. The method of claim 8, further comprising:
   determining a cache-hit ratio associated with the first plurality of key-value pairs is below a threshold; and
   in response to determining the cache hit ratio is below the threshold, disabling the unsorted caching layer so that subsequent key-value pairs are received by the sorted memory table without previously being stored in the unsorted caching layer.

13. The method of claim 8, further comprising:
   determining the number of the second plurality of key-value pairs that receive operations exceeds a threshold; and
   in response to determining the number of the second plurality of key-value pairs that receive operations exceeds the threshold, changing a size of the unsorted caching layer to store the first plurality of key-value pairs and the number of the second plurality of key-value pairs that receive the operations.

14. A non-transitory computer-readable medium comprising program code executable by a processor for causing the processor to:
   receive, at a disk storage device of a database, a first plurality of key-value pairs from a caching layer of the database and a second plurality of key-value pairs from a memory table of the database, the first plurality of key-value pairs being unsorted in the caching layer and the second plurality of key-value pairs being sorted in the memory table, and each key-value pair of the second plurality of key-value pairs previously being stored in the caching layer prior to being stored in the memory table, a size of the caching layer being adjustable based on a number of the second plurality of key-value pairs that receive operations;
   sort the first plurality of key-value pairs with the second plurality of key-value pairs; and
   store the first plurality of key-value pairs and the second plurality of key-value pairs sorted in the disk storage device.

15. The non-transitory computer-readable medium of claim 14, further comprising program code that is executable by the processor for causing the processor to sort the first plurality of key-value pairs with the second plurality of key-value pairs by:
   sorting the first plurality of key-value pairs from the caching layer to generate a first sorted list of key-value pairs;
   receiving a second sorted list of key-value pairs for the second plurality of key-value pairs from the memory table;
   merging the first sorted list and the second sorted list to generate a third sorted list of key-value pairs that includes the first plurality of key-value pairs and the second value of key-value pairs; and
   storing the third sorted list of key-value pairs in the disk storage device.

16. The non-transitory computer-readable medium of claim 14, further comprising program code that is executable by the processor for causing the processor to:
   determine a cache-hit ratio associated with the first plurality of key-value pairs is below a threshold; and
   in response to determining the cache hit ratio is below the threshold, disable the caching layer so that subsequent key-value pairs are received by the memory table without previously being stored in the caching layer.

17. The non-transitory computer-readable medium of claim 14, further comprising program code that is executable by the processor for causing the processor to:
   determine the number of the second plurality of key-value pairs that receive operations exceeds a threshold; and
   in response to determining the number of the second plurality of key-value pairs that receive operations exceeds the threshold, change a size of the caching layer to store the first plurality of key-value pairs and the number of the second plurality of key-value pairs that receive the operations.

18. The non-transitory computer-readable medium of claim 14, further comprising program code that is executable by the processor for causing the processor to:
   determine a key-value pair of the first plurality of key-value pairs is to be migrated based on a caching algorithm; and
   migrate the key-value pair to the memory table by sorting the key-value pair with the second plurality of key-value pairs.

19. The non-transitory computer-readable medium of claim 14, wherein the disk storage device receives the first plurality of key-value pairs and the second plurality of key-value pairs in response to the memory table being full.

20. The non-transitory computer-readable medium of claim 14, wherein a size of the caching layer is static.

* * * * *